United States Patent [19]

Legge et al.

[11] Patent Number: 4,911,683
[45] Date of Patent: Mar. 27, 1990

[54] SEAM FOR WORK FABRIC AND METHOD OF MANUFACTURE THEREOF

[75] Inventors: Robert W. Legge, West Bridgewater; William O. Hocking, Jr., Foxboro, both of Mass.

[73] Assignee: The Draper Felt Company, Inc., Canton, Mass.

[21] Appl. No.: 227,884

[22] Filed: Aug. 3, 1988

[51] Int. Cl.$^4$ .................................. F16H 7/00
[52] U.S. Cl. .................................. 474/255; 474/256; 428/60; 428/223
[58] Field of Search .................. 474/253–258; 198/844, 848; 24/31 B, 31 F, 31 W, 31 H, 33 P; 428/60, 223; 162/358, DIG. 1

[56] References Cited

U.S. PATENT DOCUMENTS

| | | | |
|---|---|---|---|
| 3,324,991 | 6/1967 | Voss | 198/844 X |
| 4,035,872 | 7/1977 | MacBean | 24/31 H |
| 4,267,226 | 5/1981 | Kohler et al. | 474/253 X |
| 4,401,137 | 8/1983 | Cannon | 162/DIG. 1 X |
| 4,695,498 | 9/1987 | Sarrazin et al. | 428/223 X |
| 4,755,260 | 7/1988 | Sakuma | 162/358 X |

FOREIGN PATENT DOCUMENTS

| | | | |
|---|---|---|---|
| 251873 | 1/1988 | European Pat. Off. | 162/358 |
| 703417 | 2/1954 | United Kingdom | 474/257 |

Primary Examiner—Jerome W. Massie, IV
Assistant Examiner—Matthew Smith
Attorney, Agent, or Firm—Salter & Michaelson

[57] ABSTRACT

An endless work fabric having a loop seam construction and a method of manufacture thereof is disclosed, wherein the fabric is used as a papermaker felt, a papermaker dryer fabric, a forming wire, or filter fabric. An endless belt formed of a preselected material preferably having longitudinally extending yarns included therein is collapsed upon itself to form folded ends that are stripped to expose end loops. The loops as formed in the ends of the fabric are intermeshed to define a transversely extending channel through which a pintle member is extended for joining the two ends of the folded fabric to define the endless work fabric. An alternate construction includes forming the fabric of nonwoven materials and interconnecting the ends of the collapsed fabric by a hinge-like construction through which a pintle member is extended.

20 Claims, 2 Drawing Sheets

U.S. Patent   Mar. 27, 1990   Sheet 1 of 2   4,911,683
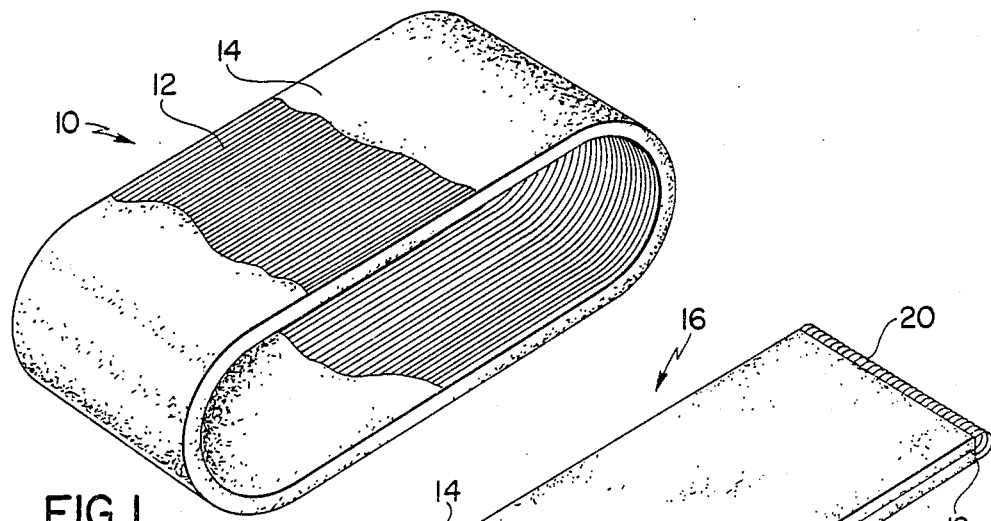
FIG. 1
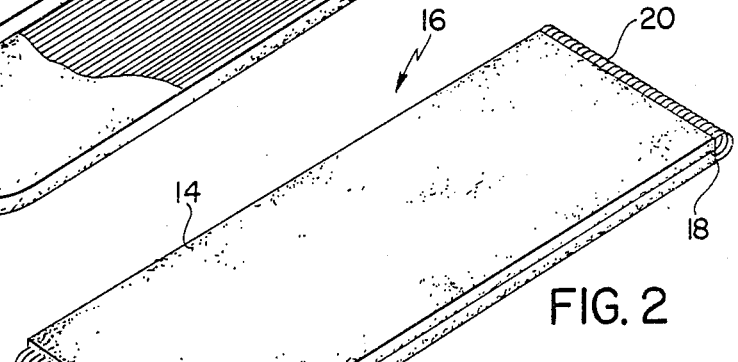
FIG. 2
FIG. 3
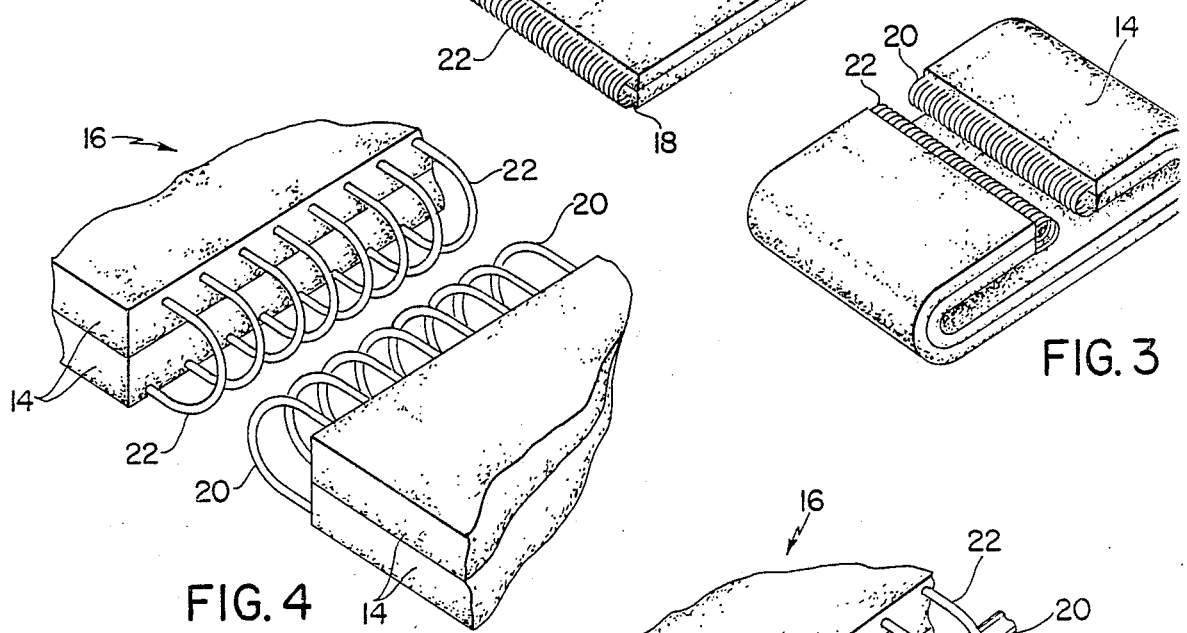
FIG. 4
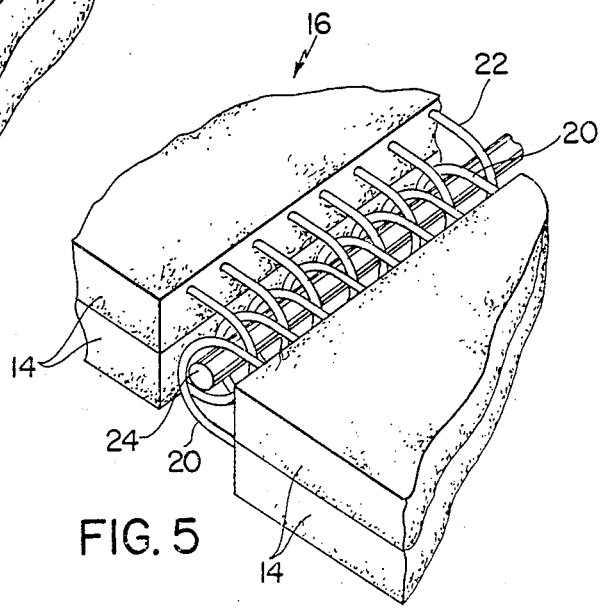
FIG. 5

SEAM FOR WORK FABRIC AND METHOD OF MANUFACTURE THEREOF

BACKGROUND OF THE INVENTION

Prior to the instant invention, endless belts have frequently been used in various industrial operations as a carrying means for many materials. Examples of such endless fabrics include heavy duty belts for transporting merchandise or produce from a warehouse to railcars or trucks, carrying belts for packaging or mail routing, filter fabrics for use in dewatering sludge resulting from the treatment of wastes, belts for use as filter fabrics for removing materials from air streams or for carrying water in humidification processes, and belts for use in papermaker fabrics such as press felts, press fabrics, forming wires and for use in dryer fabrics on a paper or other forming machine.

The present invention relates to those belts which can be utilized for the aforesaid purposes and which are formed in an endless loop, and to the method and construction by which the ends of the belt are joined together to form the endless loop. Heretofore, the fabric for endless belts was made in an endless form prior to installation; and since the fabric was endless, the operating machinery used in conjunction therewith had to be partially dismantled so that the fabric could be slipped or threaded onto the machine. Obviously, this was a slow, expensive and often dangerous method of installation in that the endless fabric was often heavy and stiff. To simplify these conditions, many fabrics have been made as an open belt, i.e., not endless, but with specifically formed ends which can accept a pintle wire for joining them when the ends are brought together, thereby making the fabric endless. In most cases, it is easier to thread a flat, open-ended fabric through a machine, and once the fabric is threaded around the rolls, to join it together making it endless. In many instances fabrics have been made endless by incorporating appropriate construction means into fabric, whereby special loops of yarn are formed at the fabric ends, the loops from both ends of the fabric thereafter being intermeshed and joined together by a pintle wire or pin that projects through the loops of yarn. Other fabric joining methods have also included the use of separately attached loop materials such as spiral wires or metal clips.

As described, one of the advantages of joining fabrics by a loop seam type joint is that heavy, cumbersome fabrics may be more easily installed on the operating machinery. As an example, fabrics, such as a press felt as used on a paper machine, may weigh as much as 1200 pounds and measure greater than 400 feet in length or greater than 400 inches in width. Although a loop seam facilitates the installation of such a fabric, the loop seam must be strong enough to withstand the tensional forces of the machine on which it is installed, and in some circumstances be open sufficiently in structure to maintain porosity normal to the body of the felt in those applications which require absolute uniformity. Examples of seamed-type fabrics as used in prior known papermaker felts and of which the applicant is aware are illustrated in U.S. Pat. Nos. 4,698,250, 4,695,498; 4,574,435; 4,250,822; 4,123,022; 4,026,331; 4,006,760; 3,815,645; 3,653,097; 3,283,388 and 2,883,734.

One of the problems experienced with the prior known loop seam construction as used in papermaking felts that utilize warp yarns to form the seam is that the seam would often fail after limited use of the felt which was usually caused by slippage and extension of the loop structure under tension due to the weave pattern or method of construction. This resulted in the loops being weakened with the eventual failure of the felt.

As will be described, the construction of the instant invention is not dependent upon any special weave pattern, and the binding loops cannot be pulled from the felt by excessive tension because they are formed as an integral part of the body of the felt.

SUMMARY OF THE INVENTION

The present invention relates to a papermaker press felt that is composed of yarns and fibers that are assembled as a noncontinuous fabric which upon installation on a papermaking machine is formed as a continuous felt through the use of a pin or yarn which is inserted through selected intermeshed loops thereby defining a seam construction.

The invention has application as a papermaker felt for use as a forming fabric, press fabric or a dryer fabric on a papermaking machine or as a filter fabric. In accordance with the invention, the fabric is first constructed of a woven fabric base or a nonwoven parallel array of yarns such as the type as described in U.S. Pat. No. 3,097,413. The woven fabric may be woven endless or flat. If woven flat, the ends of the fabric are joined, usually by hand weaving, to produce a fabric base that is formed in an endless loop. Once the fabric base has been formed, any number of layers of fiber batt material may be applied if necessary, for example, by needling techniques or adhesive means to prepare the fabric for a loop forming process by which the final fabric may be joined. This first base is made in approximately twice the desired finished length.

The first fabric base, having first been formed in a continuous and endless loop, is then collapsed upon itself, wherein a natural fold or bend is defined at opposite ends of the fabric. If machine direction yarns are present, they may, when needed, be exposed by stripping away excess fiber batt material or cross machine direction yarns. The loops or channels at both ends of the collapsed fabric that are produced by the bending of the fabric may be stabilized by needling, impregnated with resins or other stabilizing means, and the loops are then intermeshed with each other. A pintle wire or yarn is then inserted through the intermeshed loops or channels to bind the two opposite ends together, thereby forming a second fabric base of a continuous loop for further processing. After the pintle is inserted through the intermeshed loops or channels, the endless fabric is stretched to size and heat-set which also serves the purpose of producing fabric stabilization and additional stabilization of the yarn loops. Fiber batt material may also be needled in at this point to produce a fabric of predetermined size and weight.

The unique seam construction of the subject invention has a uniform thickness and porosity consistent with the body of the fabric. Regardless of the fabric size and weight, the felt can be more easily installed on the papermaking machine than conventional endless felts. Further, the seam construction can be utilized on any woven or unwoven fabric. Because of the machine direction, yarns which, when present in the fabric which bear the tension loads, are essentially continuous within the felt. These same yarns, which form the loops for the joint, makes the seam exceptionally strong.

There is no requirement for a separate operation of weaving special loops or attaching preassembled loops to the felt fabric. However, when the yarns are not present, then separate means for joining the ends will be required. This separate means may take the form of a hinge type of construction whereby the ends of the fabric will be cut out to form notches and projections that are intermeshed, whereafter a pintle is inserted through the notches and projections as formed in the fabric ends.

Accordingly, it is an object of the invention to provide a work fabric and to teach a method of manufacture thereof, wherein the fabric is initially formed in an endless belt, collapsed upon itself and then folded, the ends of the collapsed fabric being joined by a pintle that extends through a channel as formed at the fabric ends.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of an endless fabric body from which the papermaking felt of the subject invention is formed;

FIG. 2 is a perspective view of the endless fabric body shown in FIG. 1 after it has been compressed to a flattened form;

FIG. 3 is a perspective view of a compressed fabric body after excess cross machine direction yarns or fiber batt has been removed from the folded ends to expose the machine direction ends that define loops, and after the fabric body has been folded for interconnecting the end loads thereof together;

FIG. 4 is an enlarged perspective view of the exposed loops of the ends of the fabric body;

FIG. 5 is an enlarged perspective view of exposed loop ends after they have been intermeshed and then interlocked by a pintle that extends therethrough;

DESCRIPTION OF THE INVENTION

Figure 6:
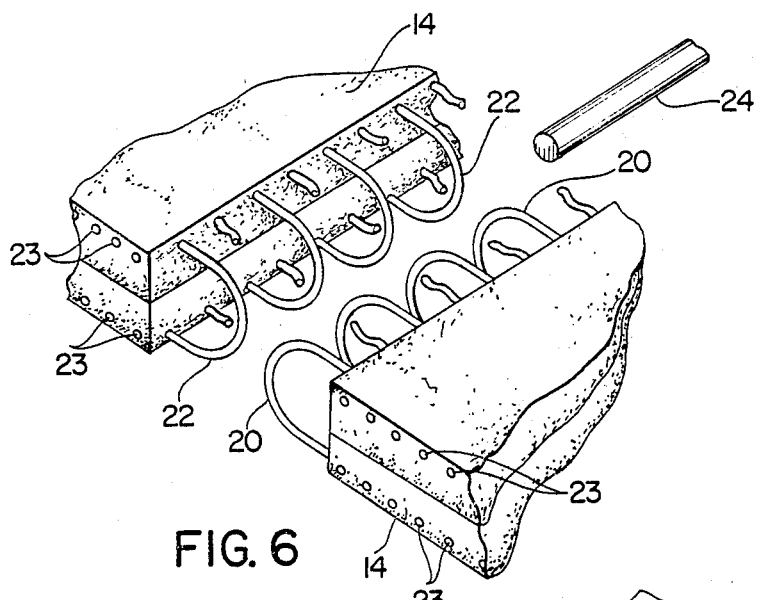
FIG 6 is an enlarged perspective view of the exposed loop ends showing alternate end loops that have been removed and prior to a pintle being received within the remaining intermeshed loop ends.

Referring now to the drawings and particularly to FIG. 1, a base fabric is illustrated and is generally indicated at 10. The base fabric 10 is formed in an endless felt by any known technique and is comprised of yarn structures generally indicted at 12 and a fiber batt material 14. The yarn structures 12 may be woven as commonly made in a weaving loom with warp or machine direction yarn and filling or cross machine direction yarn interwoven in a predetermined weave pattern, or the yarns may consist of parallel arrays of yarn being formed or layered without weaving, or, as will be described hereinafter, a completely nonwoven structure may be formed without yarns. In the preferred form of the invention as disclosed in FIGS. 1-6, the yarn structure extends in the machine direction only to provide for the loop seam as will hereinafter be described.

The composition of the machine direction yarn may consist of any of the common textile fiber polymeric materials, such as nylon, polyester, polyolefin and the like, as well as mineral and natural fibers. Specialty yarns of heat resistant material, steel, carbon or other alloys and polymers or a combination of polymers may also be used for special applications. The yarn structure may be defined by a single yarn such as a monofilament, or may be formed of several monofilaments, such as a plied, twisted or braided yarn. Staple fiber yarns and multifilament yarns may also be used. The preferred yarn as incorporated into the present invention is a single nylon or polyester monofilament.

The base fabric 10 preferably consists primarily of the yarn structure 12 that is composed of a nylon monofilament and with the fiber batt material 14 applied to one or both surfaces thereof. The fiber batt material 14 is preferably applied to the base fabric 10 by a needling process, well known in the art of papermaker felt manufacture, although batt application could also be accomplished by adhesion of the batt material 14 to the base fabric 10 with suitable adhesive's or resins. Sewing or stitching of the batt 14 to the base fabric 10 is also contemplated. The fiber batt material 14 may consist of textile fiber polymers or similar materials as used in the yarn construction described hereinabove. The preferred textile polymer is nylon because of its relative toughness, abrasion resistance and heat setting properties. The batt fibers may consist of various sizes, but the preferred size of the fiber is from 6-25 denier. Fiber batt weight will also vary, but the preferred weight ranges from 2.5-5 ounces per square yard. It is understood that the number of batts 14 applied to the base fabric 10 will vary depending upon the desired weight of the finished product.

After the endless loop of the first base fabric 10 has been formed and stabilized, the fabric is then collapsed upon itself as illustrated in FIG. 2. Thereafter, the fabric is transformed from the single base endless fabric 10 to a double base open-ended fabric generally indicated at 16 having approximately double the thickness of the first base fabric. It is understood that the single base fabric 10 as described above is not necessarily confined to a single layer and may consist of one or more yarn arrays which would define double or triple layer fabrics.

In the collapsed state, a fold or bend 18 is formed at each end of the fabric, and the collapsed fabric thus defines the second double base fabric 16. As will be described, the curvature of the fold or bend 18 at the ends of the double base fabric 16 defines the beginning stage of a loop construction for forming a loop seam. In order to form the loops for the seam, the immediate area of the end folds 18 are stripped of batt fibers in the cross machine direction to expose the loops 20 and 22 of the machine direction yarns as shown in FIG. 2. This step may not be necessary in all applications, depending on the base construction and end use. With the opposite ends of the second base fabric 16 stripped to expose the loops 20 and 22, the two ends 18 are folded over in opposed disposition as shown in FIGS. 3 and 4 to bring the loops 20 and 22 into close proximity to each other. Thereafter, the loops 20 and 22 are intermeshed; and, as shown in FIG. 5, a pintle wire or pin 24 is inserted through the loops 20 and 22 to join the two ends of the double fabric 16. In this form, the felt is now approximately one-half the size of the base fabric 10.

As further mentioned hereinabove and as further illustrated in FIG. 6, it is also contemplated to include cross machine direction yarns indicated at 23 which can be woven with the machine direction yarns 12 in any conventional manner. In this connection, the cross machine direction yarns 23 would be also stripped away at the ends of the fabric along with the batt material to expose the end loops 20 and 22 as shown in FIG. 6.

In those papermaking fabrics requiring absolute uniformity at the seam, such as in the Fourdrinier wire fabric where the paper sheet is being formed on the wire, or in the fine paper grade press felt where uniform water flow is essential, or in a heavily loaded, high speed, press felt where nonuniformity of the fabric may create damaging press roll bounce or vibration, alternate loops can be intermeshed and pinned. As illustrated in FIG. 6, alternate loops of both loops 20 and 22 are cut away, the pin 24 then being received in the remaining uncut loops 20 and 22. By pinning only alternate loops, the resulting seam is somewhat opened and more closely conforms to the consistency of the body of the fabric 16.

After joining the loops 20 and 22 as shown in FIGS. 4 or 6, depending on the design, thereby forming the second base fabric 16 in a continuous belt, the fabric 16 and the newly made loop seam are preferably heat-set under controlled time, tension and temperature conditions and in accordance with usual procedures for heat setting papermaking fabrics. When exposed to the proper tension, the pinned loops 20 and 22 will form the warp loop seam; and in a design that provides for using only alternate loops for the seam, the unpinned loops, as shown in FIG. 6, would typically be shrunk or bent to a less prominent position. In practice, the preferred method when utilizing the alternate loop method is to cut away the unpinned loops so that the remaining portions thereof will lie within the plane of the fabric and will be essentially indistinguishable.

The pintle 24 may be formed of a monofilament yarn or of a multifilament yarn composed of any several tough, polymeric resins, such as polyester or polyamide and the like, in either a single, double, plied or braided construction. If desired or necessary, one or more pintles may be used in the same seam; and pintles may also be made of stainless steel rod or cable, coated or uncoated, with plastic material or other suitable strong materials. During heat setting operations for stabilization, a steel or larger diameter pintle will be used in order to prevent bending or distortion of the pintle. It is understood that the pintle 24 should be relatively straight so that it can be received in proper alignment within the channel as defined by the intermeshed loops 20 and 22.

Heat setting of the fabric 16 may be accomplished by any of several heat setting means, such as by exposing the fabric to heated air or to a heated cylinder. Infrared or other suitable heat generating devices may also be employed as a source of heat. Either a forced hot air oven or a hot oil heated cyclinder is preferred in the present invention. Heat setting temperatures vary; but if a polyamide or polyester monofilament is used in the yarn structure, then the preferred heat setting range is between 300°-400° F. After heat setting, the fabric is installed on a conventional papermaker felt needle loom, extended to a predetermined length or placed under a predetermined tension force. Using specially designed felting needles, the fabric base is needled to consolidate, stabilize and bind the layers together. During the needling process, a temporary pintle wire is preferably used in the new seam, since the pintle wire may become damaged during the needling process. After the construction of the new felt is completed in accordance with the subject invention, a new pintle wire or yarn is installed for use by a customer at its installation.

It is understood that a number of fibrous batt layers may be needled to the base fabric. The amount of batt fiber added is dependent upon the desired finished weight of the felt. Fiber batt may be needled to the face side or back side or both as determined by need and use of the fabric. The fiber batt normally consists of the same or similar fibrous material and weights as used in the first fabric base described hereinabove. After needling is completed, the fabric may be washed, heat treated, resin treated or otherwise processed for the particular fabric properties required by the customer. Although not shown, it is understood that the needled fibrous batt layers applied over the base fabric will overlay the loop seam, and will protect the seam against abrasion and will also protect a paper sheet as carried by the endless work fabric against possible seam marking. It is also contemplated that the overlay of batt fibers as applied to the fabric may be cut or otherwise separated adjacent to the seam area in order to provide access to the seam area during the seaming process.

Figure 7:
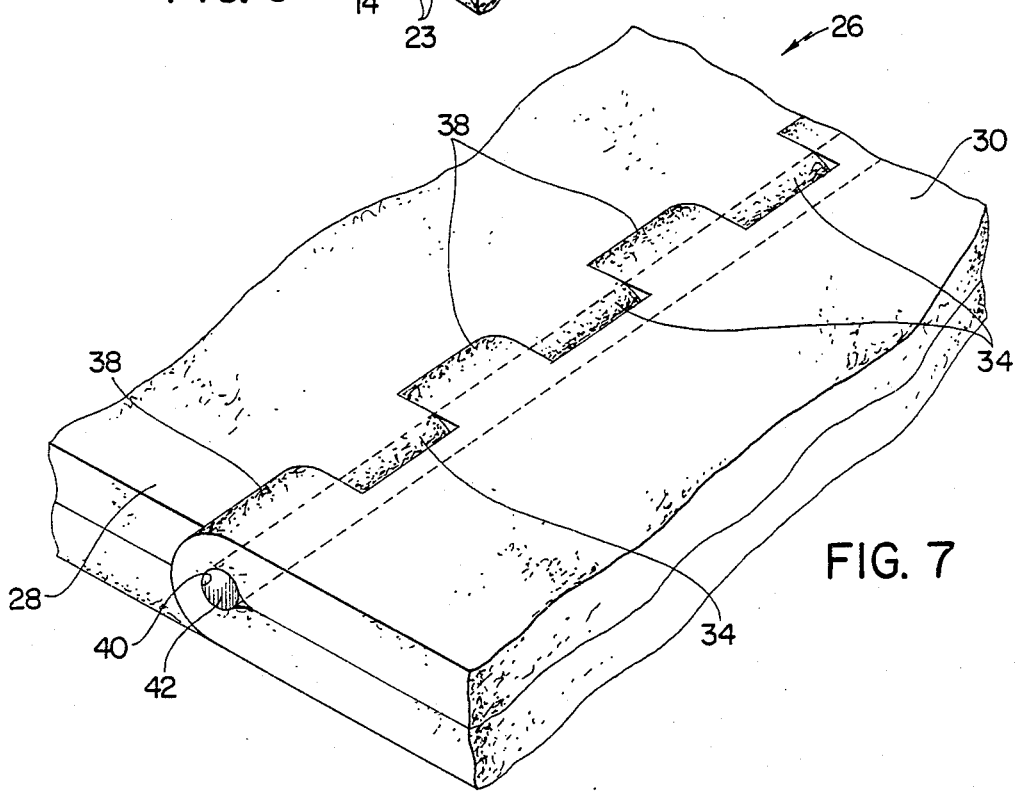
FIG. 7 is an enlarged perspective view of a modified form of the invention wherein a channel for receiving a pintle is formed by notching the bent ends of the folded fabric body.
Figure 8:
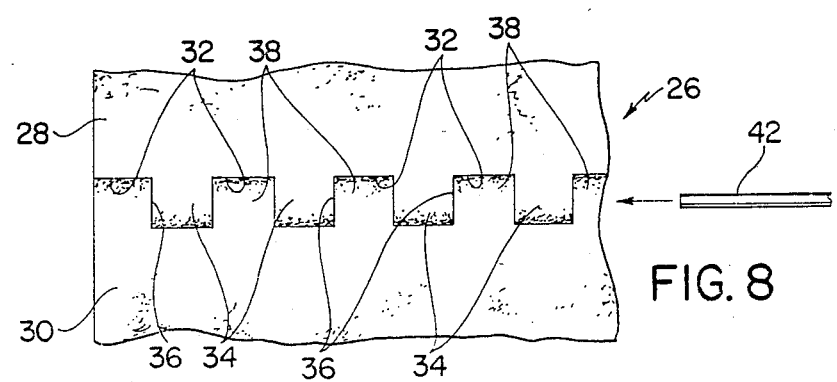
FIG. 8 is a top plan view of the modified form of the invention showing the notched ends prior to the insertion of the pintle therethrough.

Referring now to FIGS. 7 and 8, a modified form of the invention is illustrated and includes a folded fabric body generally indicated at 26 that has been previously formed in an endless belt, collapsed or compressed on itself and then folded in a manner as illustrated in FIGS. 1-3 and described hereinabove. As shown in FIGS. 7 and 8, the fabric body 26 as folded over includes end portions 28 and 30, the connection of which will be described hereinafter.

In the form of the invention as illustrated in FIGS. 7 and 8, the fabric body 26 is devoid of any woven yarns, and in particular machine direction yarns, described above in the form of the invention as shown in FIGS. 1-6, are eliminated. Instead of having machine direction yarns combined with a batt material, the fabric body 26 includes just layers of batting material that are bonded together in any convenient manner for producing a construction of desired thickness and weight. The batting material may be composed of any well known combination of fibers, although a nylon fiber is preferred. It is also contemplated that the layers of batt material that comprise the fabric body 26 be affixed by needling; although, other techniques can be employed such as by the use of adhesives, resins or heat setting. Any number of batt layers may be combined to produce the fabric body 26, although the folding of the fabric body will require a relatively flexible construction that will limit the number of layers used.

Since machine direction yarns have been eliminated from the fabric body 26, another technique is resorted to in interconnecting the end portions 28 and 30. As shown in FIG. 8, the end portion 28 is cut out along the bend or fold line thereof to define a plurality of alternately formed notches 32 and projections 34. Similarly the end portion 28 is cut out along its bend or fold line to define a plurality of alternately formed notches 36 and projections 38. When the end portions 28 and 30 are to be interconnected, the projections 34 and 38 and notches 32 and 36 are intermeshed as shown in FIGS. 7 and 8, and in effect, define a hinge line; and since the projections 34 and 38 are formed of a double layer of material, a continuous channel or bore 40 extends therethrough and the open notches 32 and 36 and the open projections 34 and 38. A pintle 42 is thereafter inserted through the channel 40 to interlock the end portions together.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A work fabric including an endless fabric body having opposed end portions that are defined by the collapsing of said fabric body upon itself, opposed interior surfaces of said fabric body thereby being disposed in abutting relation throughout the fabric body, said collapsed fabric body being folded such that the opposed end portions are disposed in adjacent relation, and means for interconnecting said opposed and adjacent end portions, thereby forming said fabric body in an endless double layer construction.

2. A work fabric as claimed in claim 1, said fabric body including at least a plurality of parallel yarns that extend in a longitudinal direction, said yarns at the opposed end portions of said fabric body defining opposed loops, said interconnecting means including a pintle that extends through said loops to interconnect said opposed end portions.

3. A work fabric as claimed in claim 2, said fabric body being formed of a woven fabric that includes yarns that are disposed in transverse relation with respect to the longitudinally extending yarns.

4. A work fabric as claimed in claim 1, said fabric body as folded upon itself having a longitudinal dimension that is approximately one-half the length of the collapsed fabric body.

5. A work fabric as claimed in claim 2, alternate loops on said opposed end portions being substantially removed.

6. A work fabric as claimed in claim 2, said fabric body further including nonwoven material.

7. A work fabric as claimed in claim 6, said fabric body including means for stabilizing said longitudinally extending yarns.

8. A work fabric as claimed in claim 7, said stabilizing means being defined by a fibrous batt that is needled into said fabric body.

9. A work fabric as claimed in claim 8, said stabilizing means being further defined by an adhesive resin or a polymer that is used in conjunction with said fibrous batt.

10. A work fabric as claimed in claim 1, said fabric body including nonwoven materials.

11. A work fabric as claimed in claim 1, the opposed ends of said fabric body being cut out to define alternately disposed notches and projections, the notches and projections of said opposed ends being intermeshed to form a channel, and said interconnecting means including a pintle that extends through said channel to lock said opposed ends together.

12. A work fabric as claimed in claim 11, said fabric body being formed of fibrous materials.

13. A method of making a work fabric, comprising the steps of forming a fabric body in an endless configuration, compressing the endless fabric body to a collapsed and flattened position to define oppositely located bent ends and for locating opposed interior surfaces of said fabric body in abutting relation throughout the fabric body, folding said fabric body such that the ends thereof are disposed in adjacent relation and interlocking said adjacent ends to form said fabric in a double layer endless construction.

14. A method as claimed in claim 13, comprising the further step of forming said fabric body of materials that include at least a plurality of parallel and longitudinally extending yarns.

15. A method as claimed in claim 14, comprising the further steps of stripping the ends of said fabric body to expose a plurality of yarn loops, intermeshing the yarn loops of the opposed ends, and interlocking said opposed ends by projecting a pintle through the intermeshed yarn loops.

16. A method as claimed in claim 15, comprising the further step of cutting away alternate yarn loops of the opposed ends.

17. A method of as claimed in claim 15, comprising the further step of applying a fibrous batt material to said fabric body.

18. A method as claimed in claim 17, comprising the further step of applying to said fabric body an adhesive resin or a polymer for use in conjunction with said fibrous batt.

19. A method as claimed in claim 13, comprising the further step of forming the fabric body of nonwoven materials.

20. A method as claimed in claim 19, comprising the further steps of forming notches in the ends of said fabric in spaced relation, wherein spaced projections are defined between the notches, intermeshing the notches and projections of said ends, and extending a pintle through the notches and projections of the intermeshed end to interlock said ends together.

* * * * *